(No Model.)
C. J. MEYERHOLZ.
PRUNING SHEARS.
No. 392,049. Patented Oct. 30, 1888.
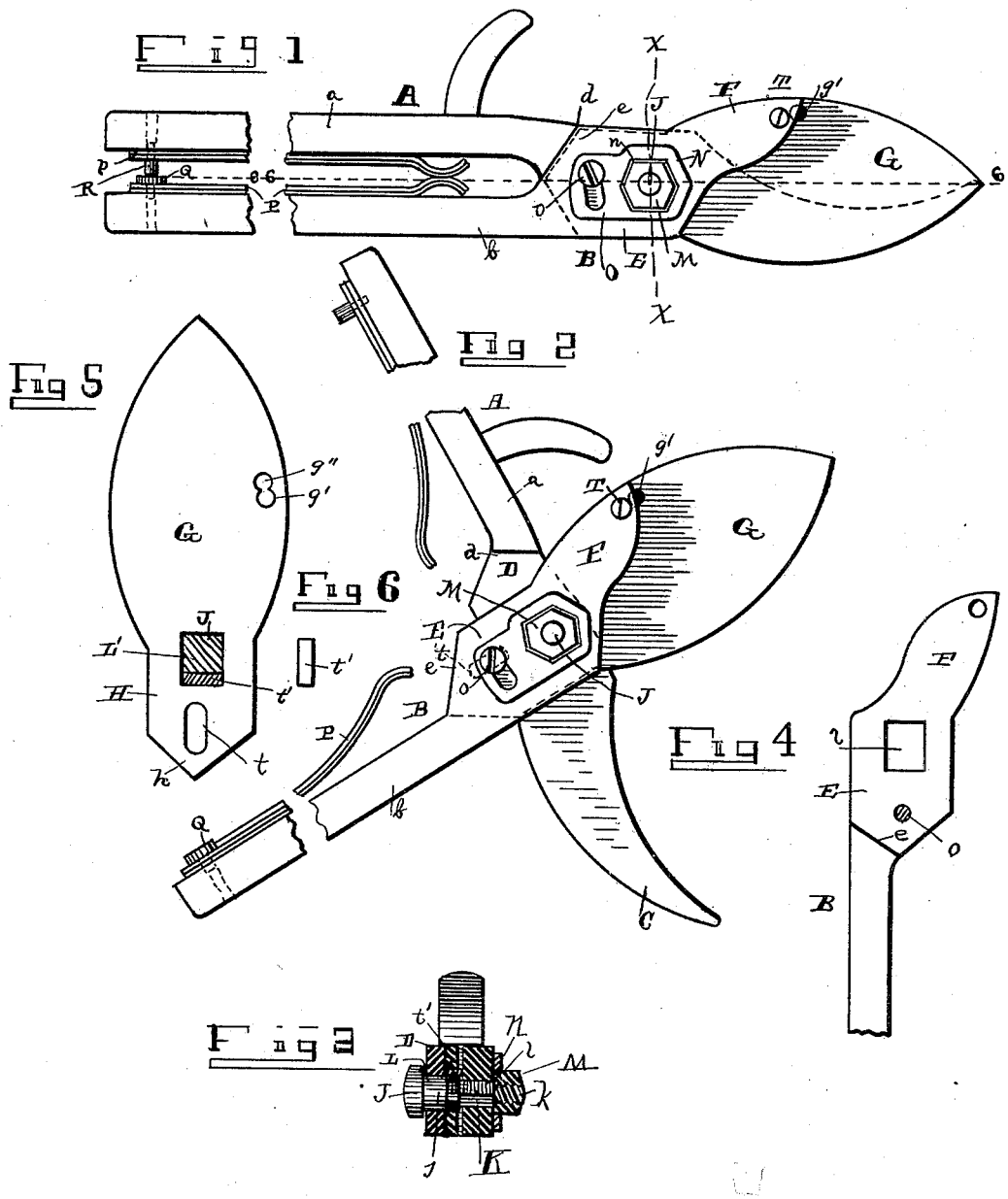
WITNESSES.
INVENTOR,
C. J. Meyerholz,
by J. S. Alexander,
Attorney.
N. PETERS. Photo-Lithographer, Washington, D. C.

UNITED STATES PATENT OFFICE.

CHRISTIAN JOSEPH MEYERHOLZ, OF SANTA CLARA, CALIFORNIA.

PRUNING-SHEARS.

SPECIFICATION forming part of Letters Patent No. 392,049, dated October 30, 1888.

Application filed July 26, 1888. Serial No. 281,069. (No model.)

*To all whom it may concern:*

Be it known that I, CHRISTIAN JOSEPH MEYERHOLZ, of Santa Clara, in the county of Santa Clara and State of California, have invented certain new and useful Improvements in Pruning-Shears; and I do hereby declare that the following is a full, clear, and exact description thereof, reference being had to the accompanying drawings, and to the letters of reference marked thereon, which form part of this specification, in which—

Figure 1 is a side view of my improved pruning-shears closed. Fig. 2 is a similar view of the same opened. Fig. 3 is a section on line $x$ $x$, Fig. 1. Figs. 4, 5, and 6 are details.

This invention is an improvement in pruning-shears; and it consists in the novel construction of the same hereinafter described, illustrated in the drawings, and concisely stated in the claims.

Referring to the accompanying drawings by letter, A and B designate the opposite portions or halves of the shears. Part A is formed with a straight handle, $a$, on the front end of which is a shear-blade, C, curved, as shown, so that its point will be on an imaginary line taken centrally between the handles and the pivot of the halves on each other, as indicated by a dotted line, 6 6, in Fig. 1. At the base of blade C is an enlarged flattened portion or shank, D, and at the junction of this shank with handle $a$ is formed an angular shoulder, $d$. Part B has a straight handle, $b$, on the front end of which is an enlargement or shank, E, corresponding in contour to shank D, and having an angular shoulder, $e$, at its junction with the handle. The shanks D and E coincide with each other when the handles are properly put together, so that the shoulders $d$ and $e$ will abut against the shanks of the opposite handle when the tool is closed. The halves are pivoted together by a bolt passing through said shanks, as hereinafter explained.

F designates an extension of shank E on the inner front portion thereof, which extension is slightly curved, as shown.

G is the cutter-blade, the cutting-edge of which is convex, as shown. This blade has a shank, H, corresponding in contour to shank E, and having an angular edge, $h$, at its end.

J designates the pivot-bolt of parts A B. This bolt has a cylindrical portion, $j$, a reduced angular portion, K, and a smaller threaded portion, $k$. Bolt J is passed through an opening, L, in shank D, the portion $j$ resting therein, and the angular portion K of bolt J engages in angular openings $l$ of shank E and $L'$ of shank H, near the front ends thereof, so that the bolt is rigid and moves with part B, and also causes the cutter-blade to move therewith. On the threaded end of bolt J, which projects through shank E, is placed a nut, M. The bolt is shouldered at the junction of parts $j$ and K, so that when nut M is tightened it will bind the bolt securely to part B, but yet permit part A to have a sufficiently free oscillating movement thereon.

N is a plate having an opening, $n$, corresponding to the shape of nut M, and having a slotted extension, O, as shown. This plate can be employed as a wrench to tighten nut M, and afterward it is slipped over said nut and secured by a set-screw, $o$, which passes through the slot in extension O and engages a suitably-threaded opening in handle B. The nut M is thus securely locked, and the escape or working loose of bolt J is effectually prevented.

Cutter-blade G is secured to shank E by means of the bolt J and by a set-screw, T, which passes through an opening in extension F and engages one of the openings or sockets, $g'$ $g''$, in the upper or outer edge of the blade. The screw $o$ also passes through shank E and engages in a slot, $t$, at the rear end of shank H, as shown.

Opening $L'$ is larger than portion K of bolt J, and a key, $t'$, is employed to bind the bolt in said opening. When the blade G is first applied to the handle, the screw T is engaged in socket $g''$, and key $t'$ is placed beneath the bolt. When the edge of the blade G becomes so worn that it does not work properly, the screws and bolts are loosened and the blade dropped until screw T can be engaged with socket $g'$, and key $t'$ is placed above portion K. I thus have an adjustable blade by which I am enabled to compensate for wear on the cutting-edge and increase the durability of the tool.

The edge $h$ of shank H fits against the shoulder $e$ of handle B, and relieves the fastenings from part of the strain when the tool is in use. The point of blade G when the tool is closed is on the line 6 6, as shown.

P is a flat spring—preferably double-leaved—attached to handle *b* by means of a stud, Q, the end of which is reduced and riveted to the handle through the spring. *p* is a similar spring attached to handle *a* by means of a stud, R. The springs serve to separate the handles and open the tool, and the projecting studs Q R limit its closing. Handle *a* is also provided with a finger guard or stop, *r*.

It will be seen from the foregoing that when closed the handles are close together, the points of the blades are in line with the pivot and handles, and the pivot of the parts is so far in advance of the shoulders that the handles can be distended to a greater angle than ninety degrees.

Having described my invention, what I claim is—

1. The combination, in a pruning-shears, of the part A, having handle *a*, curved blade C, and shank D, with the part B, having a handle, *b*, shank E, provided with extension F, and the adjustable cutter-blade G, having openings $g'$ $g^2$, and a shank, H, the set-screw, and the pivot-bolt and springs, substantially as described.

2. The combination of the part A, having a curved shear-blade, and the part B, having a cutter-blade, with the bolt pivoting the parts together, the nut M on said bolt, the slotted locking-plate N, and set-screw *o*, for securing said plate on part B, substantially as specified.

3. The combination of the part A, having handle *a*, shank D, and shear-blade C, and the part B, having handle *b*, enlargement E, extension F, and shoulder *e*, with the blade G, having shank H, formed with angular opening L', the bolt J, having portions *j*, K, and *k*, the nut and locking-plate, and set-screw therefor, all constructed and arranged substantially as and for the purpose specified.

4. The herein-described pruning-shears, consisting of the part A, having a handle, a shank, D, and a shear-blade, C, and the part B, having a handle, *b*, a shank, E, and its extension F, in combination with the cutter-blade G, having angular opening L', sockets $g'$ $g''$, and slot *t*, and the bolt J, having angular portion K, and set-screws T and *o*, and the studs Q and R, all substantially as and for the purpose set forth.

In testimony that I claim the foregoing as my own I affix my signature in presence of two witnesses.

CHRISTIAN JOSEPH MEYERHOLZ.

Witnesses:
 JOSIAH N. KNOX,
 HARVEY E. KNOX.